Patented Feb. 27, 1951

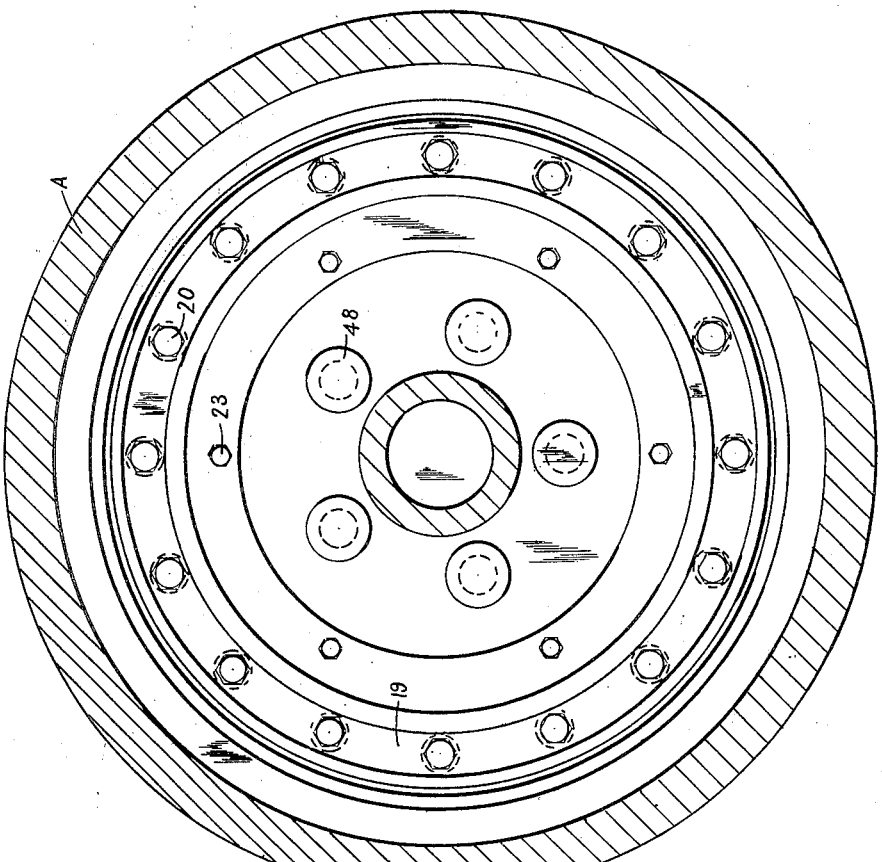
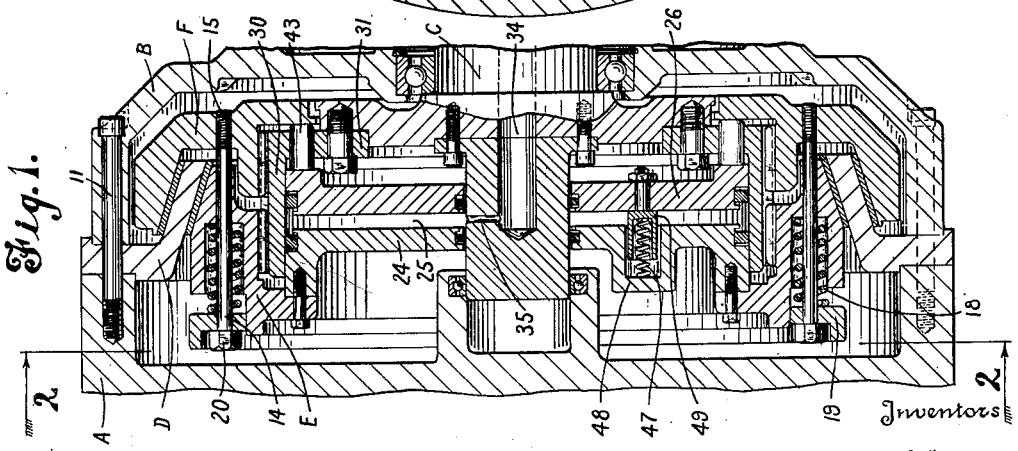

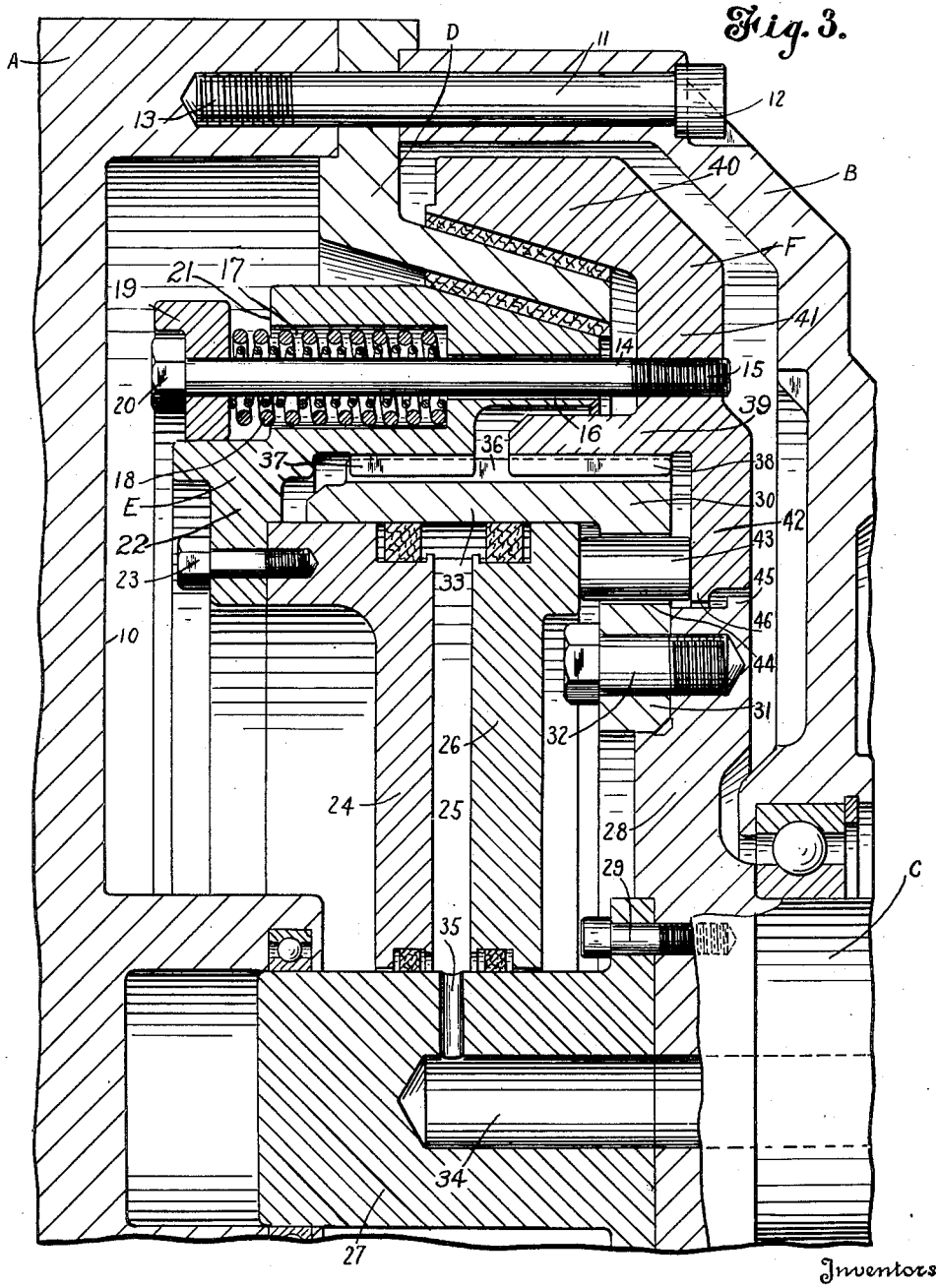

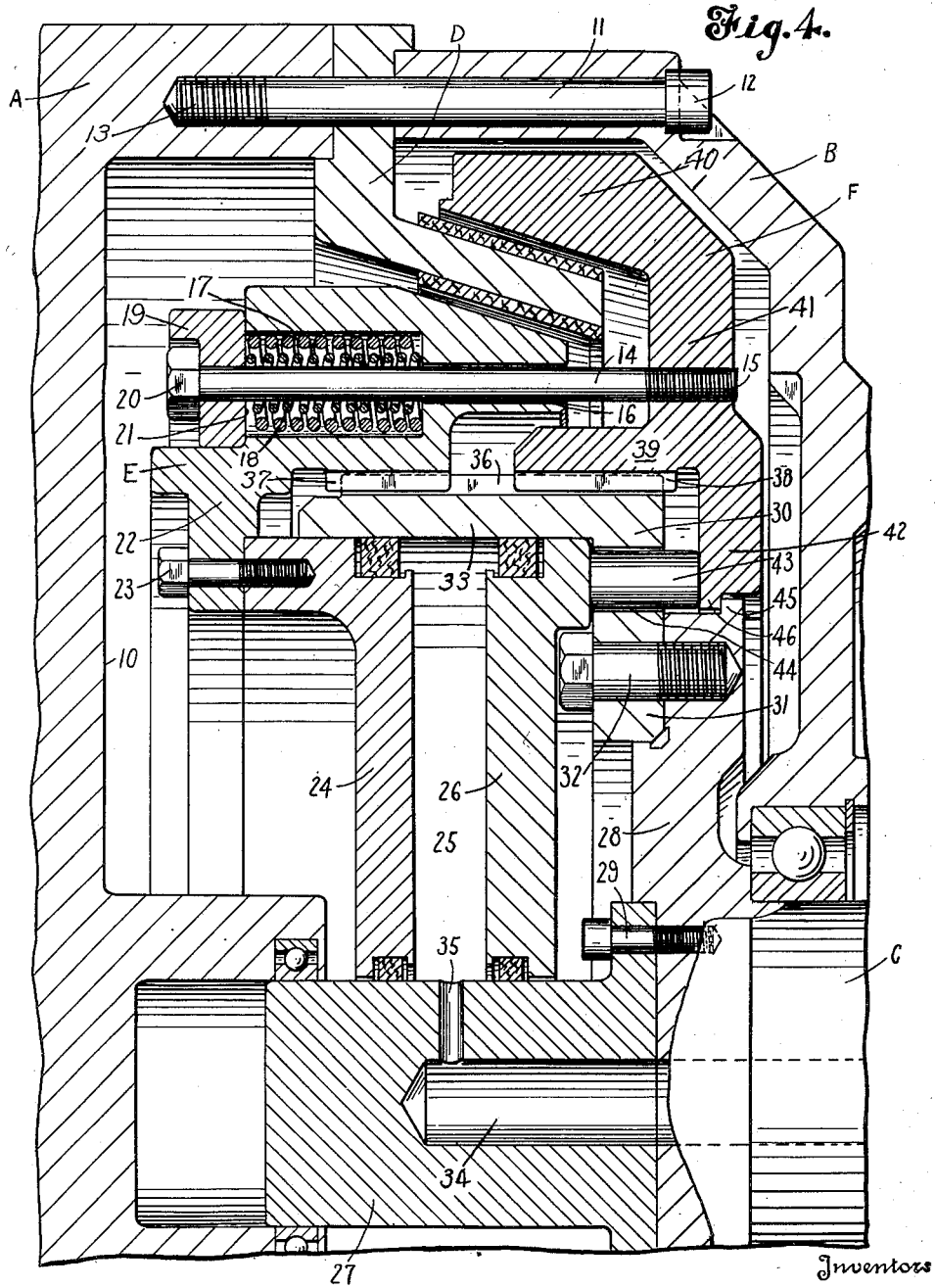

2,543,252

UNITED STATES PATENT OFFICE 2,543,252

CLUTCH MECHANISM

Arthur T. Nabstedt, Hamden, and John O. Berndtson, Short Beach, Conn., assignors to The Snow-Nabstedt Gear Corporation, New Haven, Conn., a corporation of Connecticut Application April 30, 1947, Serial No. 744,818

11 Claims. (Cl. 192—91)

This invention relates to clutch mechanism, and more particularly to a friction clutch that can be used very advantageously in connection with marine reverse gears, although the clutch is applicable to other uses.

One of the objects is to provide a friction clutch of simple and compact structure which transmits a large amount of power.

Another object is to provide an improved and simplified friction clutch that is operable by fluid pressure, for example, the pressure of air or a liquid such as oil.

In the accompanying drawings:

Fig. 1 is a longitudinal central section of a clutch embodying the invention, the same being shown in the engaged position;

Fig. 2 is a section on line 2—2 of Fig. 1;

Fig. 3 is a section showing on a larger scale certain parts illustrated in Fig. 1; and Fig. 4 is a section similar to Fig. 3, showing the clutch in the disengaged position.

In the drawings, there is shown a form of clutch embodying the invention, which is particularly useful in marine reversing gears. In this particular case a shaft is adapted to be driven by a marine engine, the connection being made at the forward end of the shaft, and the rearward end of the shaft (not shown) being adapted to drive a propeller or other take-off. In this particular case the flywheel of the engine and a casing member connected to the flywheel, which is concentric with the shaft, create in conjunction a hollow casing in which a fluid-actuated friction clutch is arranged. One of the clutch members is a member connected to the casing intermediate of the ends of the casing and projecting into the casing. The clutch has two other members in non-rotative relation to the shaft between which the first-mentioned clutch member is adapted to be clamped. In the case shown, the clutch is normally maintained in the engaged position by suitable springs, and fluid pressure is used for disengaging the clutch, the fluid-pressure mechanism including a pressure cylinder and also including annular pistons movable in this cylinder. These pistons are adapted to actuate the respective clutch members between which the intermediate casing-carried member of the clutch is interposed, in the manner hereinafter described. In this particular case the pressure fluid, acting upon the piston members, reaches the pressure cylinder through a longitudinal passage in the driven shaft, and in this case also the annular piston members surround and move along a portion of the driven shaft.

In the drawings, the flywheel of the engine is indicated at A, the casing member connected thereto at B, and the driven shaft at C. The intermediate clutch member previously referred to is indicated generally at D, and the two other clutch members at E and F, respectively, the member E being a forward member and the member F a rearward member. The members E and F are shifted to releasing position by pistons moving along the forward end portion of the shaft, one of these pistons being attached to the member E and the other piston shifting member F through intermediate members, as hereinafter described.

In the form shown, the flywheel A is recessed or chambered at the face disposed toward the clutch, so as to provide a chamber 10 in which some of the clutch parts are disposed. The clutch member D is supported intermediate of the ends of the combined structure AB providing a rotary casing member, said clutch member being mounted in this particular case between the adjacent edges of the parts A and B. Screws 11, having heads 12 accessible at the rear of part B, secure the parts A and B together, with the part D interposed between them. The screws 11 have threaded ends 13 engaging sockets in the flywheel. That part of member D which is clamped between the other members is in the nature of a web or flange carrying, as an integral part thereof, the clutching portion of part D, which clutching portion has parallel surfaces to which suitable friction material is applied, thus providing conical friction surfaces adapted to be engaged by the members E and F, respectively. The clutching portion of member D is directed inwardly and rearwardly at an acute angle from the attaching or mounting portion of said member.

The members E and F are tied together by a plurality of guide pins 14 having threaded rear ends 15 secured in sockets in member F, the bodies of said pins extending in a forward direction and passing through holes 16 formed in the clutching portion of member E, and these pins also pass through sockets 17 provided in the member E forwardly of the holes 16. In the sockets 17 are disposed helical springs 18 surrounding the guide pins. The guide pins also pass through holes in a limiting ring 19 located rearwardly of nuts 20 screwed upon the forward ends of the pins 14. The springs 18 may, as shown, include a heavy outer coil and a light inner coil. These springs are under compression, and they press against the bottoms of the sockets 17 so that normally they hold the clutch in the engaged position by pushing the member E to the right (Fig. 4) and pulling the member F to the left, whereby the clutch member D is tightly gripped between the other clutch members.

The ring 19 with which the guide pins are equipped acts as a limiting means, limiting the releasing movement of the members E and F, because this ring is located in an angle or rabbet provided in member E such that, when a face 21 on said member has moved to the left through a certain distance (Fig. 4), it will come into contact with the ring. The face of the member E which contacts with the ring is the face in which the sockets 17 are provided.

The part of member E that is provided with the conical surface engaging member D is a ring-like part extending rearwardly from the body portion of member E, the previously described holes and spring sockets being provided in this part. From this part the member E is continued inwardly and transversely to provide a part 22, which part has connected to it by bolts 23 an annular piston 24. This piston operates in a fluid-pressure cylinder 25, and there also operates in this cylinder a piston 26 which actuates member F in the manner hereinafter described. For disengaging the clutch, the piston 24 is adapted to be moved forwardly and the piston 26 moved rearwardly.

The cylinder 25 is formed in part by a cylindrical extension 27 provided upon the forward end of the shaft C, and this cylinder is formed in part by a flange structure including a flange 28, which in this particular case is integral with the shaft C and to which the shaft extension 27 is secured by means such as bolts 29. A further part of the fluid-pressure cylinder is provided by an angular ring-like member 30 having an inwardly extending flange 31 fastened to the flange 28 by means such as bolts 32. The member or part 30 also has a generally cylindrical body portion 33 providing a cylinder wall, which wall is engaged by the radially outer portions of the pistons 24 and 26. The radially inner portions of the pistons 24 and 26 engage a cylindrical portion of the shaft extension. The pistons are provided with suitable packing, as shown.

Pressure fluid enters the space between the pistons from a longitudinal passage 34 in the shaft which leads to a number of lateral passages 35 extending to the outer surface of the shaft in a region between the pistons.

The member 30, previously mentioned, is fixed with relation to the shaft by being fastened to the flange 28, and this member serves for interlocking clutch members E and F with respect to the shaft, although permitting their axial movement. For this purpose the radially outer surface of member 30 is provided with splines 36, and these are engaged by splines 37 carried by the ring-like rearwardly extending part of member E. These splines 36 are also engaged by splines 38 provided at the radially inner surface of a ring or ledge 39 integral with the clutch member F and extending forwardly therefrom.

The member F has a radially outer part 40 extending in a forward direction and provided with an inner conical surface adapted to engage the friction surface of member D. The part 40 is integral with a body portion or web 41. At the radially inner portion of the body or web 41 the latter has integral therewith the ring portion or ledge 39 which extends forwardly, and it also has integral therewith an inwardly extending portion or flange 42. The member F is adapted to be thrust rearwardly by the piston 26 acting against pins or plungers 43 that are located in holes 44 passing through the part 31 of member 30. The forward ends of the plungers engage the rear face of piston 26, and the rear ends of the plungers engage the forward face of the flange 42.

Rearward movement of member F is limited in a suitable manner, as by providing a peripheral lip 45 upon the flange 28, which lip is adapted to be engaged by an inwardly projecting lip 46 on the radially inward portion of flange 42. The releasing movement of member E is arrested by the stop ring 19, as previously described, the position of this ring obviously being dependent upon the position of the member F, to which the guide pins are secured. The guide pins are secured to the body or web portion 41 of member F.

The pistons 24 and 26 are separated from each other by the pressure fluid coming into the space between them, for the purpose of releasing the clutch. The piston 26 will move rearwardly as far as is permitted, carrying with it the member F, and the piston 24 will move forwardly as far as permitted by the limiting ring, the position of which in turn depends upon the position of member F. For the purpose of maintaining control on the movement of the pistons toward each other, suitable means may be provided, so that in the engaged position of the clutch the pistons will not have an undesirable amount of movement. For this purpose a connection may be provided between the pistons, as indicated at 47 in Fig. 1, this connection embodying a number of devices arranged at intervals around the pistons, each device including a separating spring 48 engaging a socketed wall portion of one piston and engaging also an axially adjustable member 49 carried by the other piston and having a socket that receives the spring. These devices will prevent the pistons from coming into contact with each other, and they will maintain a space between the pistons which is in communication with the source of pressure fluid.

It is believed that the operation of the clutch will be apparent from the foregoing description. Normally the clutch is held in the engaged position by the springs socketed in the member E which, being under compression, urge the member E toward the right (Fig. 4), while at the same time the springs acting upon the stop ring and guide pins pull the member F to the left, whereby the intermediate member of the clutch is firmly clamped between the other two members, thereby transmitting power from the driving member to the shaft C, both members E and F being splined to the member 30 that is fast with the shaft. To disengage the clutch, the pressure fluid is introduced between the pistons 24 and 26, which move oppositely, piston 26 shifting member F through the pins 43 and piston 24 shifting the member E through its rigid connection with said member. Upon release of the fluid pressure, the springs act to restore the axially movable clutch members to the engaged position.

The clutch is of simple structure, having a minimum number of parts, is capable of transmitting a large amount of power, and is sturdy and serviceable.

Various modifications and structural changes may be made without departing from the principles of the invention or the scope of the claims. The illustrated embodiment is by way of example only.

We do not claim broadly herein a clutch mechanism comprising a rotary casing member adapted to act as a driving member, a shaft located within said casing member, a clutch member mounted peripherally of said casing member and projecting inwardly into the casing member, means including two clutch members located within the casing member and in non-rototative relation to the shaft between which said first clutch member is adapted to be clamped, at least one of said two clutch members being an axially movable member, and fluid-pressure actuating means for the clutch comprising a piston member fixed to said axially movable member, as claimed in our companion application of even date, Serial No. 744,817.

What we claim is:

1. In clutch mechanism, the combination of a rotary casing member adapted to act as a driving member, a shaft having an end portion located within said casing member, a clutch member mounted peripherally of said casing member and projecting inwardly into said casing member, means including two oppositely movable clutch members located within the casing member and in non-rotative relation to the shaft and at opposite sides of said first clutch member between which said first clutch member is adapted to be clamped, spring means normally holding said movable clutch members in engagement with said first clutch member, and fluid-pressure means radially inwardly of said movable clutch members comprising a cylinder and axially movable pistons in said cylinder for causing disengagement of the clutch by opposite and separating movement of said pistons.

2. In clutch mechanism, the combination of a rotary casing member, a shaft located within said casing member, a clutch member mounted peripherally of said casing member intermediate of the ends of said member and projecting inwardly into said casing member, axially movable clutch members in said casing member at opposite sides respectively of said first clutch member and in non-rotative relation to the shaft, between which said first clutch member is adapted to be clamped by opposite movement of said clutch members, guide pins fixed to one of said axially movable clutch members and projecting through openings in the other member, springs embracing said guide pins and acting on said axially movable clutch members to move them toward each other and cause engagement of the clutch, and fluid-pressure means including pistons operatively connected with the radially inner parts of the respective axially movable clutch members and having a separating movement for disengaging the clutch.

3. In clutch mechanism, the combination of a casing member, a clutch member rigidly mounted upon a peripheral portion of said casing member intermediate of the ends of said member and projecting into the interior of the casing member, a shaft located within the casing member, a member rigid with the shaft axially movable clutch members in splined relation to said last-mentioned member adapted to clamp said first clutch member from opposite sides, said axially movable clutch members being interconnected by means including guide pins fixed to one member and extending through holes in the other member, springs embracing said guide pins normally holding the clutch in the engaged position, and fluid-pressure means for moving the axially movable clutch members away from each other to thereby disengage the clutch, said fluid-pressure means including a piston operatively connected to one of said axially movable clutch members by means of interposed pressure transmitting members.

4. In clutch mechanism, the combination of a casing member, a clutch member rigidly mounted upon a peripheral portion of said casing member and projecting into the interior of the casing member, a shaft located within the casing member, a member rigid with the shaft axially movable clutch members in splined relation to said last-mentioned member adapted to clamp said first clutch member from opposite sides by movement toward each other, said axially movable clutch members being interconnected by means including guide pins fixed to one member and extending through holes in the other member, springs embracing said guide pins normally holding the clutch in the engaged position, a stop ring at the far side of one of said movable clutch members mounted on the ends of said guide pins, and fluid-pressure means for moving the axially movable clutch members away from each other to thereby disengage the clutch, said fluid-pressure means including a piston directly connected to one of said axially movable members, and a second oppositely moving piston operatively connected to the other axially movable member.

5. In clutch mechanism, the combination of a rotary casing member adapted to act as a driving member, a shaft having an end portion located within said casing member, a clutch member connected rigidly to the periphery of said casing member and having a part with parallel conical surfaces directed inwardly into said casing member at an acute angle to the shaft axis, two oppositely movable ring-like cone-clutch members within the casing member and in non-rotative relation to the shaft, between which said first clutch member is adapted to be clamped, spring means normally holding the members of the clutch in engagement with each other, a cylinder wall member arranged in a space radially between said oppositely movable clutch members and said shaft, oppositely movable pistons in the cylinder provided by said wall member, and means connecting said pistons with the radially inner parts of said movable clutch members whereby on separating movement of the pistons the clutch is disengaged.

6. In clutch mechanism, the combination of a rotary casing member adapted to act as a driving member, a shaft having an end portion located within said casing member, a clutch member connected rigidly to the periphery of said casing member and having a part with parallel conical surfaces directed inwardly into said casing member at an acute angle to the shaft axis, two oppositely movable ring-like cone-clutch members within the casing member and in non-rotative relation to the shaft, between which said first clutch member is adapted to be clamped, spring means normally holding the members of the clutch in engagement with each other, a cylinder wall member arranged in a space radially between said oppositely movable clutch members and said shaft, oppositely movable pistons in the cylinder provided by said wall member, and means connecting said pistons with the radially inner parts of said movable clutch members whereby on separating movement of the pistons the clutch is disengaged, said last means including a direct connection between one piston and one of said movable clutch members, and an indirect pressure-transmitting connection between the other piston and the other movable clutch member.

7. A clutch mechanism as defined in claim 6, in which the cylinder wall member is provided with external splines and in which the movable clutch members are provided at their radially inner parts with splines engaging the splines of said cylinder wall member.

8. In clutch mechanism, the combination of a rotary hollow casing member having a substantially cylindrical peripheral portion, a shaft located within said casing member, a clutch member mounted rigidly upon said peripheral portion of said casing member and having an inwardly extending part with inner and outer cone surfaces at an acute angle to said shaft, axially movable clutch members in said casing member at opposite sides of said first clutch member and in non-rotative relation to the shaft, between which said first clutch member is adapted to be clamped, springs normally holding the clutch members engaged, a cylinder wall member between the movable clutch members and the shaft with which the radially inner parts of said movable clutch members are in splined relationship, oppositely movable pistons movable longitudinally of the shaft in the cylinder provided by said cylinder wall member, one of said pistons being rigidly connected to one of said movable clutch members, and means of operative connection between the other piston and the other movable clutch member whereby on separating movement of the pistons the clutch members are disengaged.

9. In clutch mechanism, the combination of a rotary hollow casing member having a substantially cylindrical peripheral portion, a shaft located within said casing member, a clutch member mounted rigidly upon said peripheral portion of said casing member and having an inwardly extending part with inner and outer cone surfaces at an acute angle to said shaft, axially movable clutch members in said casing member at opposite sides of said first clutch member and in non-rotative relation to the shaft, between which said first clutch member is adapted to be clamped, springs normally holding the clutch members engaged, a cylinder wall member between the movable clutch members and the shaft with which the radially inner parts of said movable clutch members are in splined relationship, oppositely movable pistons movable longitudinally of the shaft in the cylinder provided by said cylinder wall member, one of said pistons being rigidly connected to one of said movable clutch members, and means of operative connection between the other piston and the other movable clutch member whereby on separating movement of the pistons the clutch members are disengaged, said springs being coil springs socketed in one of said movable clutch members and surrounding guide rods which pass through holes in said clutch member and are rigidly fastened at certain ends thereof to the other movable clutch member.

10. In clutch mechanism, the combination of a rotary hollow casing member having a substantially cylindrical peripheral portion, a shaft located within said casing member, a clutch member mounted rigidly upon said peripheral portion of said casing member and having an inwardly extending part with inner and outer cone surfaces at an acute angle to said shaft, axially movable clutch members in said casing member at opposite sides of said first clutch member and in non-rotative relation to the shaft, between which said first clutch member is adapted to be clamped, springs normally holding the clutch members engaged, a cylinder wall member between the movable clutch members and the shaft with which the radially inner parts of said movable clutch members are in splined relationship, oppositely movable pistons movable longitudinally of the shaft in the cylinder provided by said cylinder wall member, one of said pistons being rigidly connected to one of said movable clutch members, and means of operative connection between the other piston and the other movable clutch member whereby on separating movement of the pistons the clutch members are disengaged, said springs being coil springs socketed in one of said movable clutch members and surrounding guide rods which pass through holes in said clutch member and are rigidly fastened at certain ends thereof to the other movable clutch member, said guide rods carrying adjacent the ends opposite their fastened ends a slidable stop ring which is engaged by the other movable clutch member for limiting the separating movement of said movable clutch members.

11. In clutch mechanism, the combination of a rotary hollow casing member, a shaft located within said casing member, a friction clutch member rigidly mounted upon the peripheral portion of said casing member and having a cone-clutch portion projecting inwardly into said casing member intermediate of the ends of said casing member, axially movable cone-clutch members in said casing member at opposite sides of said cone-clutch portion and in non-rotative relation to the shaft, between which said portion is adapted to be clamped, guide pins each fixed at one end to one of said movable clutch members and projecting through openings in the other movable clutch member, springs embracing said guide pins and acting on said axially movable clutch members to cause the clutch members normally to be interengaged, a stop ring for said movable clutch members slidable on the ends of said guide pins which are opposite the ends fixed to one of said clutch members, a cylinder wall member splined to the radially inward parts of said movable clutch members, oppositely movable pistons within said cylinder wall member, and means of connection between said pistons and the radially inner parts of said movable clutch members whereby on separating movement of the pistons the clutch is disengaged.

ARTHUR T. NABSTEDT.
JOHN O. BERNDTSON.

REFERENCES CITED

The following references are of record in the file of this patent:

UNITED STATES PATENTS

| Number | Name | Date |
|---|---|---|
| 1,270,794 | Dawson et al. | July 2, 1918 |
| 1,946,263 | Bach | Feb. 6, 1934 |
| 1,948,190 | Shelor | Feb. 20, 1934 |
| 1,985,422 | Pearmain | Dec. 25, 1934 |
| 2,135,617 | Geyer | Nov. 8, 1938 |
| 2,203,296 | Fleischel | June 4, 1940 |
| 2,345,410 | Mierley | Mar. 28, 1944 |
| 2,374,688 | La Brie | May 1, 1945 |
| 2,380,572 | Barron | July 31, 1945 |

FOREIGN PATENTS

| Number | Country | Date |
|---|---|---|
| 14 024 | Great Britain | June 19, 1906 |
| 152 037 | Germany | June 16, 1904 |
| 319,637 | Germany | Mar. 12, 1920 |
| 846,798 | France | Sept. 26, 1939 |